US011157768B1

(12) United States Patent
Levinson

(10) Patent No.: US 11,157,768 B1
(45) Date of Patent: Oct. 26, 2021

(54) TRAINING A MACHINE LEARNING MODEL FOR OPTIMIZING DATA LEVELS FOR PROCESSING, TRANSMISSION, OR STORAGE

(71) Applicant: Zoox, Inc., Foster City, CA (US)

(72) Inventor: Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 134 days.

(21) Appl. No.: 16/433,870

(22) Filed: Jun. 6, 2019

(51) Int. Cl.
*G06K 9/00* (2006.01)
*G06K 9/62* (2006.01)
*G06T 1/20* (2006.01)
*G05D 1/02* (2020.01)
*G06N 20/00* (2019.01)

(52) U.S. Cl.
CPC ......... *G06K 9/6228* (2013.01); *G05D 1/0231* (2013.01); *G05D 1/0276* (2013.01); *G06K 9/6298* (2013.01); *G06N 20/00* (2019.01); *G06T 1/20* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2018/0204051 A1* | 7/2018 | Li | G06T 7/11 |
| 2018/0329418 A1 | 11/2018 | Baalke et al. | |
| 2019/0205700 A1 | 7/2019 | Gueguen | |
| 2020/0134772 A1 | 4/2020 | Poudel Karmatha et al. | |
| 2020/0234068 A1* | 7/2020 | Zhang | G06K 9/6265 |
| 2020/0249314 A1* | 8/2020 | Eshet | G01S 13/584 |

OTHER PUBLICATIONS

Office Action for U.S. Appl. No. 16/433,901, dated Jan. 21, 2021, Levinson, "Optimizing Data Levels for Processing, Transmission, or Storage Based on Location Information", 11 pages.

* cited by examiner

*Primary Examiner* — Atiba O Fitzpatrick
(74) *Attorney, Agent, or Firm* — Lee & Hayes, P.C.

(57) ABSTRACT

Techniques are discussed for determining a data level for portions of data for processing. In some cases, a data level can correspond to a resolution level, a compression level, a bit rate, and the like. In the context of image data, the techniques can determine a region of first image data to be processed a high resolution and a region of second image data to be processed at a low resolution. The regions can be determined by a machine learned algorithm that is trained to output identifications of such regions. Training data may be determined by identifying differences in outputs based on the first and second image data. The image data associated with the determined regions and the determined resolutions can be processed to perform object detection, classification, segmentation, bounding box generation, and the like, thereby conserving processing, bandwidth, and/or memory resources in real time systems.

20 Claims, 8 Drawing Sheets

TRAINING A MACHINE LEARNING MODEL FOR OPTIMIZING DATA LEVELS FOR PROCESSING, TRANSMISSION, OR STORAGE

BACKGROUND

Sensor data can be captured to represent objects in an environment. In some cases, sensor data can be processed to detect objects, classify objects, generate a bounding box associated with the object, and the like. Such processing is often performed in resource-constrained environments, where an amount of available processing is limited, an amount of processing time is limited, or an amount of memory is limited, among other constraints. These resource-constrained environments can present challenges in accurate and timely processing of data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
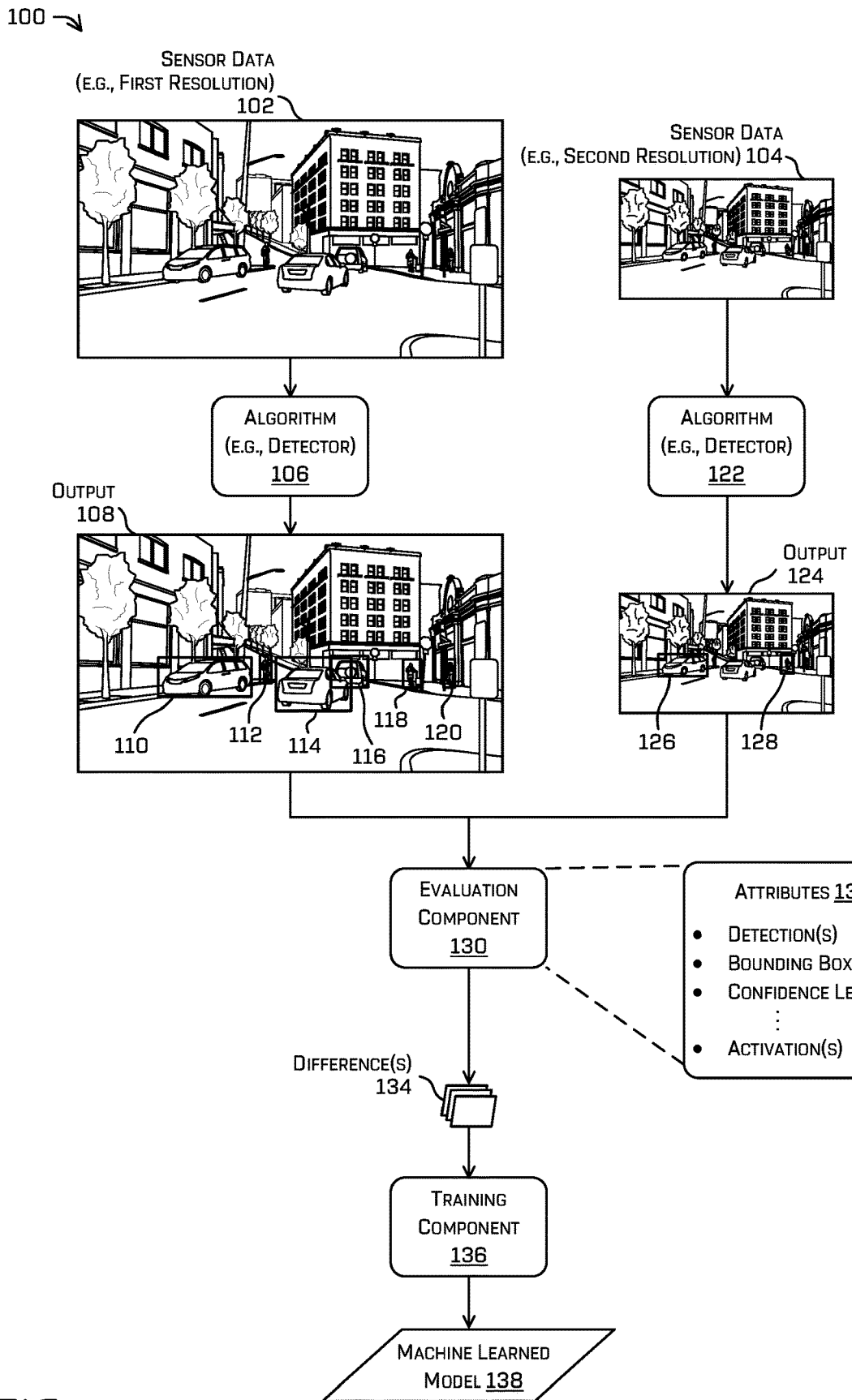
FIG. 1 is a pictorial flow diagram of an example process for training a machine learning model based on differences in algorithm outputs associated with different input data levels.

This disclosure is directed to techniques for determining a data level for portions of data for processing, transmission, and/or storage. In some cases, a data level can correspond to a resolution level, a compression level, a bit rate, and the like. For example, in the context of image data, the techniques are directed to determining regions of the image data to be processed at a first resolution (e.g., a high resolution) and regions of the image data to be processed at a second resolution (e.g., a low resolution). The region(s) can be determined by a machine learned algorithm that is trained to output identification(s) of such region(s) and/or can be determined based on a location in an environment. In the context of autonomous vehicles, sensor data (e.g., image data) can be captured and the image data can be input to a machine learned model that outputs regions to be processed at a first resolution and a second resolution. The image data associated with the determined regions and the determined resolutions, for example, can be processed to determine information such as object detection(s), classification(s), bounding box(es), segmentation information, and the like. Processing data at an optimal data level (e.g., at an optimal resolution) conserves processing and/or memory resources in real time systems, for example.

A machine learning model can be trained to identify region(s) or portion(s) of data to be processed at various data levels (e.g., resolution levels, compression levels, bit rates, etc.). For example, first training data associated with a first resolution can be input to an algorithm to generate information. For example, image data can be input to a machine learned model trained to detect objects in an environment. The first training data can be associated with a first resolution. The first training data can be down sampled, compressed, or otherwise manipulated to determine second training data. In some cases, the second training data can be associated with a second resolution that is lower than the first resolution. The second training data can be input to the machine learned model to detect objects. Outputs based on the first training data and the second training data can be compared to determine differences, such as an object that was detected in the first training data but was not detected in the second training data. In such cases, the differences can be used to train a machine learning model to identify portions of data that would benefit from being processed at a higher resolution level compared to a lower resolution level.

As noted, above, a data level can include, but is not limited to, resolution level(s), compression level(s), bit rate(s), and the like. For example, image data can be generated at a first resolution (e.g., 3000×4000 pixels) and can be down sampled to a second resolution (e.g., 1500×2000 pixels). In some cases, image data can be captured at a "raw" or uncompressed level and can be compressed to a particular compression level (e.g., represented as a compression ratio between an uncompressed size (or first size) and a compressed size). In the context of audio data, such data can be represented at a first bit rate (e.g., 1,411 kbps) and a second bit rate (e.g., 256 kbps). In some cases, data levels can correspond to various resolution levels or bit rates and compression levels. The data levels discussed herein are by way of example, and other data levels are contemplated within the scope of this disclosure.

In some cases, a machine learning model can be trained to determine data level(s) for region(s) based on data received from a plurality of sensor data types. For example, sensor data can comprise image data and lidar data corresponding to the image data. In some examples, the first training data can comprise first image data and first lidar data and can be input to an algorithm (such as a detector) to determine information about the first training data. In some cases, the second training data can differ from the first training data by at least one aspect. For example, the second training data can comprise second image data at a lower resolution than the first image data but can also comprise the same lidar data as the first training data. In some cases, the second training data can comprise the same image data and second lidar data that differs from the first lidar data.

In some cases, the data level(s) for region(s) can be determined based on map data or location data associated with an environment. For example, an autonomous vehicle capturing sensor data can determine a location of the autonomous vehicle in the environment with respect to map data. In some cases, the map data can indicate locations of drivable areas, buildings, trees, telephone poles, traffic lights, and the like in the environment. Based on extrinsic information and/or intrinsic information associated with a sensor (e.g., a location of the sensor on the autonomous vehicle, a field of view, lens parameters, etc.) the operations can include determining region(s) where data representing objects are likely to benefit from being processed at a high resolution. For example, operations can include unprojecting (e.g., associating a two-dimensional pixel location with a location in a three-dimensional map) captured image data into map data to determine a distance between an origin associated with the image data and a region in the environment. In some cases, if a distance meets or exceeds a distance threshold, a region of the image data can be processed at a first resolution (e.g., a highest resolution). In some cases, if a distance associated with a region is below a distance threshold, a region of the image data can be processed at a second resolution (e.g., a resolution lower than the first resolution).

In some examples, a location of a sensor can be determined and a data level can be selected or determined based on the location. For example, a first location may be associated with an urban environment frequently associated with pedestrians, while a second location may be associated with a highway or region where pedestrians may not be present. In such an example, the techniques can include determining a location of the sensor and selecting a data level for processing, transmitting, or storing the data based on the location. In some examples, the location may be a specific location or a general categorization of an environment.

As noted above, a machine learned model can output data level(s) for portion(s) or region(s) of data for subsequent processing, transmission, and/or storage. In some cases, the machine learning model (or another component) can evaluate the portion(s) or region(s) to determine an optimized portion or region for input to a graphics processing unit (GPU). For example, where two regions of an image are identified as regions to be processed at a highest resolution, and whereby the regions may at least partially overlap in a horizontal portion of the image data, the operations may include determining a "band" of image data corresponding to the regions to input to a GPU. In such an example, contiguous blocks or chunks of data can be input to a GPU for subsequent processing to improve a computational efficiency of the GPU. Thus, even in cases where region(s) may not be indicated as benefitting from a highest data level, such region(s) can be identified in a band or slice associated with other region(s) indicated as benefitting from the highest data level and can be input to an algorithm at the highest data level to improve subsequent operations on the GPU, thereby improving the overall efficiency of the operations discussed herein.

The techniques discussed herein can improve functioning of a computing device, such as a computing device of an autonomous vehicle, in a number of additional ways. In some examples, determining data level(s) for portion(s) or region(s) of data can reduce a size of data to be processed. In some example, lower resolution data can be used for region(s) where accuracy and/or precision is not compromised by using such data, while in some cases, higher resolution data can be used for region(s) that are determined or predicted to benefit from higher resolution data. In some cases, using higher resolution data can increase an accuracy or precision of determining additional data. Overall, the techniques discussed herein can reduce an amount of processing time without reducing an accuracy (or by minimizing any reduction of accuracy) of determining additional data (e.g., detection(s), classification(s), bounding box(es), and the like), which can reduce a latency of processing systems. Reducing latency can improve safety outcomes and/or comfort levels by controlling an autonomous vehicle, for example, to alter a trajectory or otherwise navigate the autonomous vehicle safely in an environment. In the context of transmissions, the techniques can reduce an amount of data to be transmitted by identifying region(s) to transmit at a first (e.g., high) data level and a second (e.g., low) data level. In some cases, data optimized using the techniques discussed herein can be saved in memory using the corresponding data level(s), which may reduce an amount of memory required for storing such data. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, or in an aerial surveying context. In another example, the techniques can be used in a remote security system (e.g., comprising an image sensor), for example, which can identify data level(s) for region(s) associated with data to be transmitted, processed, and/or stored. Additionally, the techniques described herein can be used with real data (e.g., captured using sensor(s)), simulated data (e.g., generated by a simulator), or any combination of the two.

FIG. 1 is a pictorial flow diagram of an example process 100 for training a machine learning model based on differences in algorithm outputs associated with different input data levels.

In some examples, the process 100 can include receiving sensor data for training a machine learning model. Examples of such sensor data include sensor data 102 (e.g., associated with a first resolution) and sensor data 104 (e.g., associated with a second resolution). In some examples, the second resolution can be lower than the first resolution.

The sensor data 102 can represent first training data (or a first data set). The sensor data 102 can be input to an algorithm 106, which can produce an output 108. By way of example, the algorithm 106 can comprise a detector that detects objects represented in the sensor data 102. Examples of detections in the output 108 include detections 110, 112, 114, 116, 118, and 120. For example, the detections 110, 114, and 116 can correspond to vehicles in an environment. The detections 112, 118, and 120 can correspond to pedestrians in the environment. As can be understood, the algorithm 106 can be trained to detect any number and/or types of objects in an environment, and is not limited to those described herein.

Although the output 108 is illustrated as image data with corresponding detections 110, 112, 114, 116, 118, and 120, in some instances the output 108 can comprise locations and object types without image data. That is, the output 108 may not be in a graphical format and may comprise machine readable data for subsequent processing.

Although described as a detector, the algorithm 106 can comprise any type of algorithm. Examples of the algorithm include, but are not limited to, a detector, a classifier, a segmenter, and the like. Although discussed in the context of image data, the algorithm 106 can process any type of data, including but not limited to image data, lidar data, sonar data, time-of-flight data, radar data, GPS data, audio data, text, and the like.

The sensor data 104 can represent second training data (or a second data set). In some examples, the sensor data 104 can be generated based on the sensor data 102. For example, the sensor data 102 can be down sampled, compressed, or otherwise processed to determine the sensor data 104. In some examples, the sensor data 104 can represent a separate data entity with respect to the sensor data 102, and in some instances, the sensor data 104 can represent a subset of the sensor data 102. For example, the sensor data 104 can correspond to a portion of the sensor data 102 sampled at regular or irregular intervals (or otherwise manipulated) to represent lower resolution image data.

The sensor data 104 can be input to an algorithm 122, which can produce an output 124. Examples of detections in the output 124 include detections 126 and 128. For example, the detection 126 can correspond to vehicle in an environment, while the detection 128 can correspond to a pedestrian in the environment. As can be understood, the algorithm 122 can be trained to detect any number and/or types of objects in an environment, and is not limited to those described herein.

In some examples, the algorithm 106 is the same algorithm as the algorithm 122. However, in some examples, the algorithm 106 may be different than the algorithm 122. For example, the algorithm 106 may have been trained on data associated with the first resolution while the algorithm 122 may be haven trained on data associated with the second resolution.

The outputs 108 and 124 can be provided to an evaluation component 130 which can evaluate attributes 132 to determine difference(s) 134 in the outputs 108 and 124. In some examples, attributes may include, but are not limited to, detection(s), bounding box(es), confidence level(s), regions(s) or portion(s) of data, segmentation information, activation(s) (e.g., of layer(s) of the algorithms 106 and 122), and the like.

For example, the evaluation component 130 can compare the outputs 108 and 124 to determine the differences therein. By way of example, and without limitation, the output includes detections 126 and 128 which correspond to the detections 110 and 118, respectively. Thus, in some examples, with respect to detections, the difference(s) 134 can comprise the detections 112, 114, 116, and 120 detected in the output 108 but not detected in the output 124 (e.g., differences in a number of detections). In some examples, the differences may correspond to the region(s) of data corresponding to the respective detections.

In some examples, the differences can correspond to differences in detections. In some examples, such differences can correspond to a binary difference (e.g., whether a detection was determined with respect to the sensor data 102 but not determined with respect to the sensor data 104) or non-binary differences. Such non-binary differences may include, but are not limited to, different classification(s) of object(s) with respect to the sensor data 102 and 104, differences in bound box location(s), size(s), shape(s), and the like, differences in confidence level(s) associated with output, and the like. In some examples, the evaluation component 130 can compare differences to determine whether the differences meet or exceed threshold value(s) that indeed are to be interpreted as differences. For example, a first detection with respect to the sensor data 102 may represent a bounding box with a first (high) confidence level and a first shape, and a second detection with respect to the sensor data 104 may represent a bounding box with a second (low) confidence level with a second shape that is different that the first shape. In some cases, if a difference between the first confidence level and a second confidence level is above a threshold, the difference can be considered a difference for training purposes.

In some instances, the difference(s) 134 (and/or region(s) of the sensor data 102 and/or 104 corresponding to the differences) can be input to a training component 136. The training component 136 can train a machine learning model to output a machine learned model 138 to identify portion(s) or region(s) of data and/or data level(s) corresponding to the data that should be processed at a first data level and/or a second data level.

In some examples, the training component 136 can include functionality to input training data (e.g., lower resolution image data) to a machine learning model where a known result (e.g., a ground truth, such as the known region(s) corresponding to the difference(s) 134) can be used to adjust weights and/or parameters of the machine learning model to minimize an error.

Figure 2:
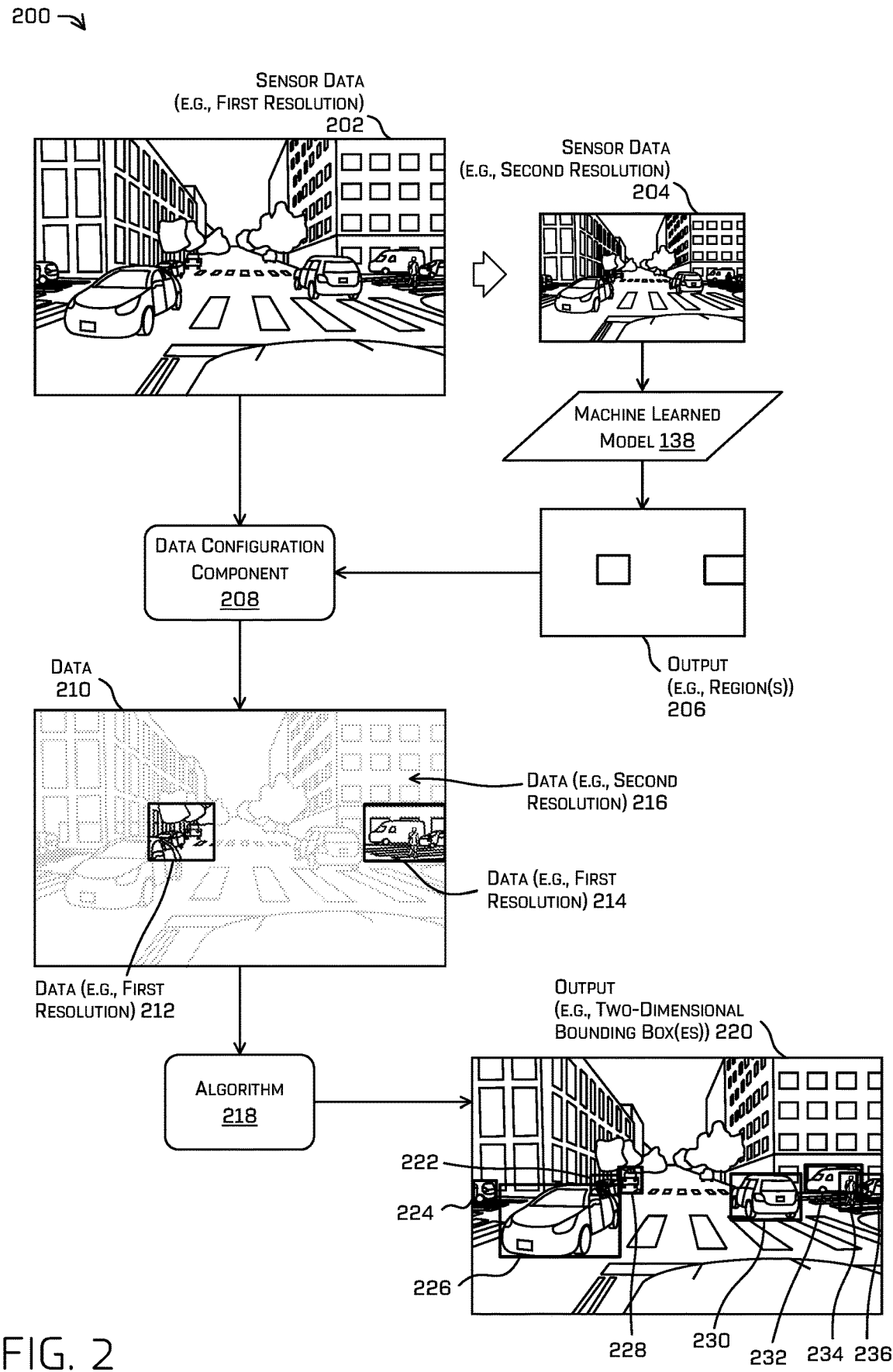
FIG. 2 is a pictorial flow diagram of an example process for using a machine learned model to identify data levels for regions of sensor data for determining additional information associated with objects represented in the sensor data.

FIG. 2 is a pictorial flow diagram of an example process 200 for using a machine learned model to identify data levels for regions of sensor data for determining additional information associated with objects represented in the sensor data.

In some examples, the process 200 can include capturing or receiving sensor data of an environment. In the context of an autonomous vehicle, the process 200 can include capturing sensor data 202 (e.g., image data associated with a first resolution). The sensor data 202 can be down sampled, compressed, or otherwise manipulated to generate sensor data 204 (e.g., image data associated with a second resolution that is less than the first resolution).

The sensor data 204 can be input to the machine learned model 138 (e.g., trained in accordance with the process described in connection with FIG. 1). In some examples, the machine learned model 138 is trained to identify portion(s) or region(s) of the sensor data 204 that should be processed at the first resolution and/or the second resolution.

An example output of the machine learned model 138 is illustrated as an output 206. In some examples, the output 206 can identify portion(s) or region(s) of the sensor data 204 and/or a data level associated with such portion(s) or region(s).

In some examples, the machine learned model 138 can determine that a region corresponding to the entirety of the sensor data 204 should be represented at the first resolution or the second resolution.

The output 206 can be received by a data configuration component 208. In some examples, the data configuration component 208 can receive at least a portion of the sensor data 202 and/or the sensor data 204. Based on the output 206, the data configuration component 208 can select, determine, or otherwise generate data 210 to be used to subsequent processing. In some examples, the data configuration component can expand or enlarge a region of interest associated with the output 206 to be processed at the higher resolution.

For the purpose of discussion, the data 210 illustrated as an image comprising data 212 and 214 (e.g., associated with a first resolution) and data 216 (e.g., associated with a second resolution). The data 216 is illustrated at a same scale of the sensor data 202 but is illustrated in gray to aid in understanding. In some examples, the data 210 can represent a composite image comprising a portion of the sensor data 202 and a portion of the sensor data 204. In some examples, the data 210 can include some or all of the sensor data 204 and can separately include portions of the sensor data 202 corresponding to the data 214. In some instances, an output from the algorithm 218 (discussed below) based on the sensor data 204 can be suppressed or otherwise replaced by an output based on the portion of the data 214 (e.g., based on the sensor data 202).

The data 210 can be input to an algorithm 218 to determine an output 220. In some examples, the algorithm 218 can comprise a machine learned model trained to generate bounding boxes associated with an object. As illustrated, the output 220 can comprise two-dimensional bounding boxes output by the algorithm 218. For example, the output 220 comprise bounding boxes 222, 224, 226, 228, 230, 232, 234, and 236. As illustrated, the bounding boxes can correspond to regions associated with data 212, 214, and/or 216.

Figure 3:
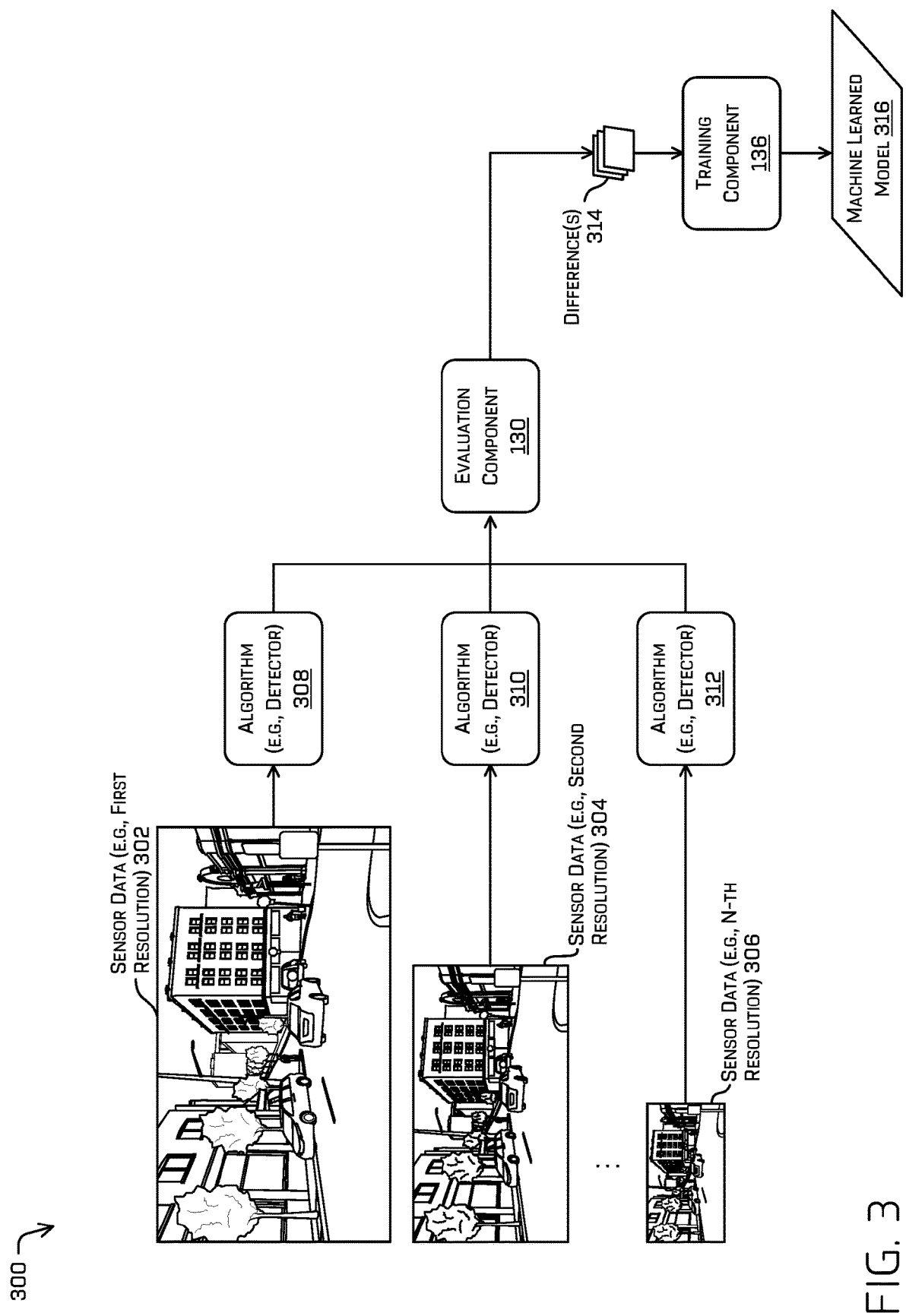
FIG. 3 is a pictorial flow diagram of an example process for training a machine learning model based on various input data levels.

FIG. 3 is a pictorial flow diagram of an example process 300 for training a machine learning model based on various input data levels.

In some examples, sensor data can be represented at any number of data levels. For examples, sensor data 302 is represented at a first resolution, sensor data 304 is represented at a second resolution, and sensor data 306 is represented at an N-th resolution.

The sensor data 302 can be input to an algorithm 308 to determine data associated with the sensor data 302. As discussed, the algorithm 308 can determine a variety of data, including but not limited to detection data, classification data, segmentation information, and the like.

The sensor data 304 can be input to an algorithm 310 to determine data associated with the sensor data 304. As discussed, the algorithm 310 can determine a variety of data, including but not limited to detection data, classification data, segmentation information, and the like. The detection data can be determined via a detection operation, the classification data can be determined via a classification operation, the segmentation information can be determined via a segmentation operation, and the like.

Similarly, the sensor data 306 can be input to an algorithm 312 to determine data associated with the sensor data 306. As discussed, the algorithm 312 can determine a variety of data, including but not limited to detection data, classification data, segmentation information, and the like.

In some examples, the algorithms 308, 310, and 312 can be a same algorithm, and in some examples, the algorithms 308, 310, and 312 can be different algorithms.

Outputs of the algorithms 308, 310, and/or 312 can be provided to the evaluation component 130. As noted above, the evaluation component 130 can determine difference(s) 314, which can be input to the training component 136.

The training component 136 can train a machine learning model, which can be represented as a machine learned model 316. In this example, the machine learned model 316 would be trained to determine data levels associated with region(s) of input data, whereby the data levels correspond to a first resolution, a second resolution, and a third resolution, etc.

Figure 4:
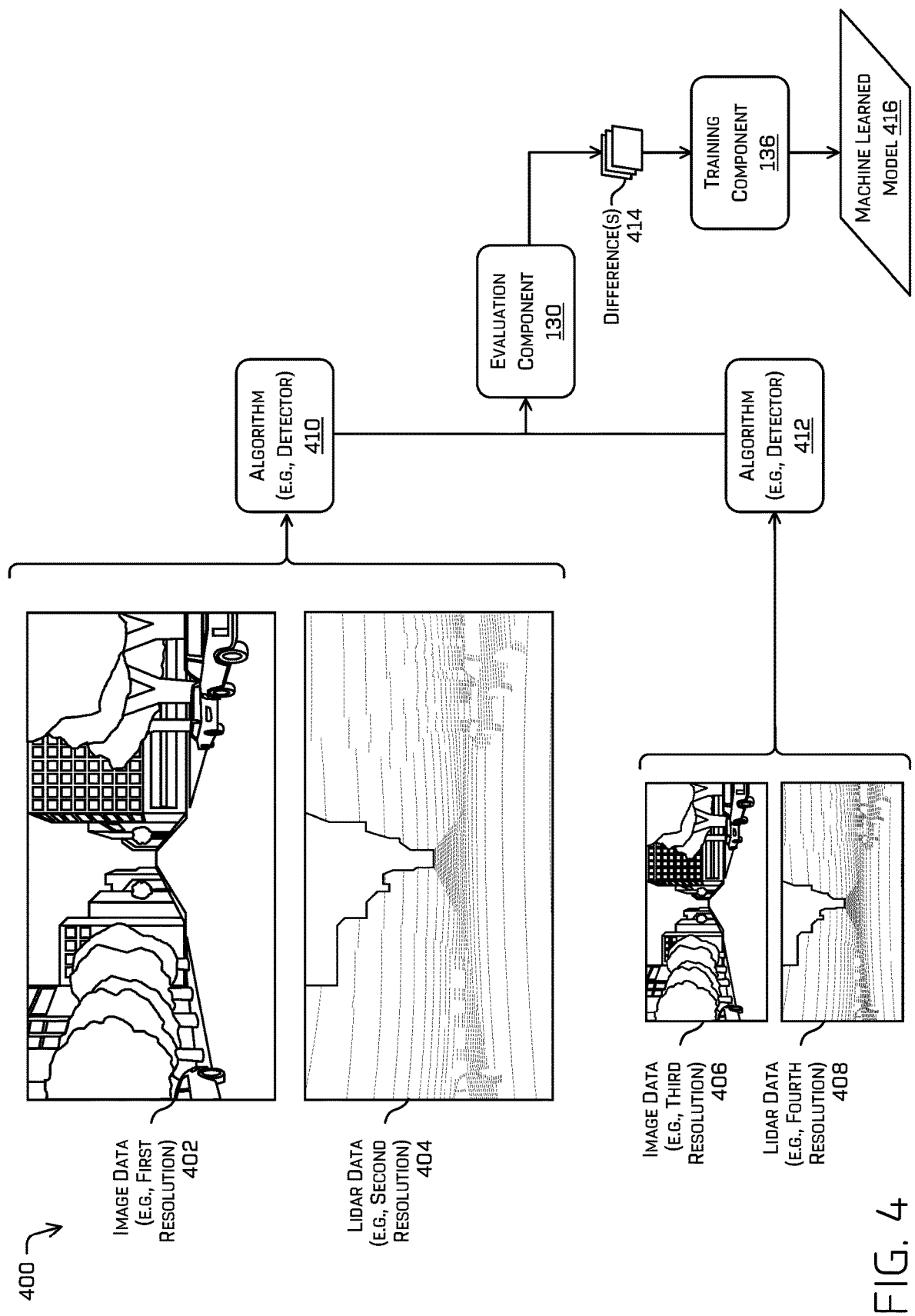
FIG. 4 is a pictorial flow diagram of an example process for training a machine learning model based on sensor data from a plurality of sensor types.

FIG. 4 is a pictorial flow diagram of an example process 400 for training a machine learning model based on sensor data from a plurality of sensor types.

In some examples, the process 400 can include capturing or receiving sensor data of an environment. By way of example, the sensor data can comprise image data 402 (e.g., associated with a first resolution) and lidar data 404 (e.g., associated with a second resolution).

At least one aspect of the image data 402 and/or the lidar data 404 can be varied to generate additional sensor data for training a machine learning model, as discussed herein.

For example, image data 406 can be generated or otherwise determined, whereby the image data 406 is associated with a third resolution. In some examples, the third resolution is a same as the first resolution. In some examples, the third resolution is different (e.g., less than) the first resolution.

Lidar data 408 can be generated or otherwise determined, whereby the lidar data 408 is associated with a fourth resolution. In some examples, the fourth resolution is a same as the second resolution. In some examples, the fourth resolution is different (e.g., less than) the second resolution.

In some examples, the image data 402 and the lidar data 404 can collectively represent first training data. For example, the image data 402 and the lidar data 404 may be fused or otherwise associated such that location and/or depth data from the lidar data 404 can be associated with corresponding pixels of the image data 402.

The first training data can be input to an algorithm 410 that can determine additional information about the first training data. For example, the algorithm 410 can determine one or more of detection information, classification information, segmentation information, and the like.

In some examples, the image data 406 and the lidar data 408 can collectively represent second training data. For example, the image data 406 and the lidar data 408 may be fused or otherwise associated such that location and/or depth data from the lidar data 408 can be associated with corresponding pixels of the image data 406.

The second training data can be input to an algorithm 412 that can determine additional information about the second training data. For example, the algorithm 412 can determine one or more of detection information, classification information, segmentation information, and the like.

Outputs from the algorithms 410 and 412 can be received by the evaluation component 130. As noted above, the evaluation component 130 can determine difference(s) 414, which can be input to the training component 136.

The training component 136 can train a machine learning model, which can be represented as a machine learned model 416. In this example, the machine learned model 416 would be trained to determine data levels associated with region(s) of input data comprising both image data and lidar data, whereby the data levels correspond to one or more of a first resolution, a second resolution, a third resolution, and/or a fourth resolution. Accordingly, the machine learned model 416 is configured to receive image data and lidar data and to determine which region(s) of the image data and/or lidar data to process at a first resolution (e.g., a low resolution) and/or which region(s) of the image data and/or the lidar data to process at a second resolution (e.g., a higher resolution).

Figure 5:
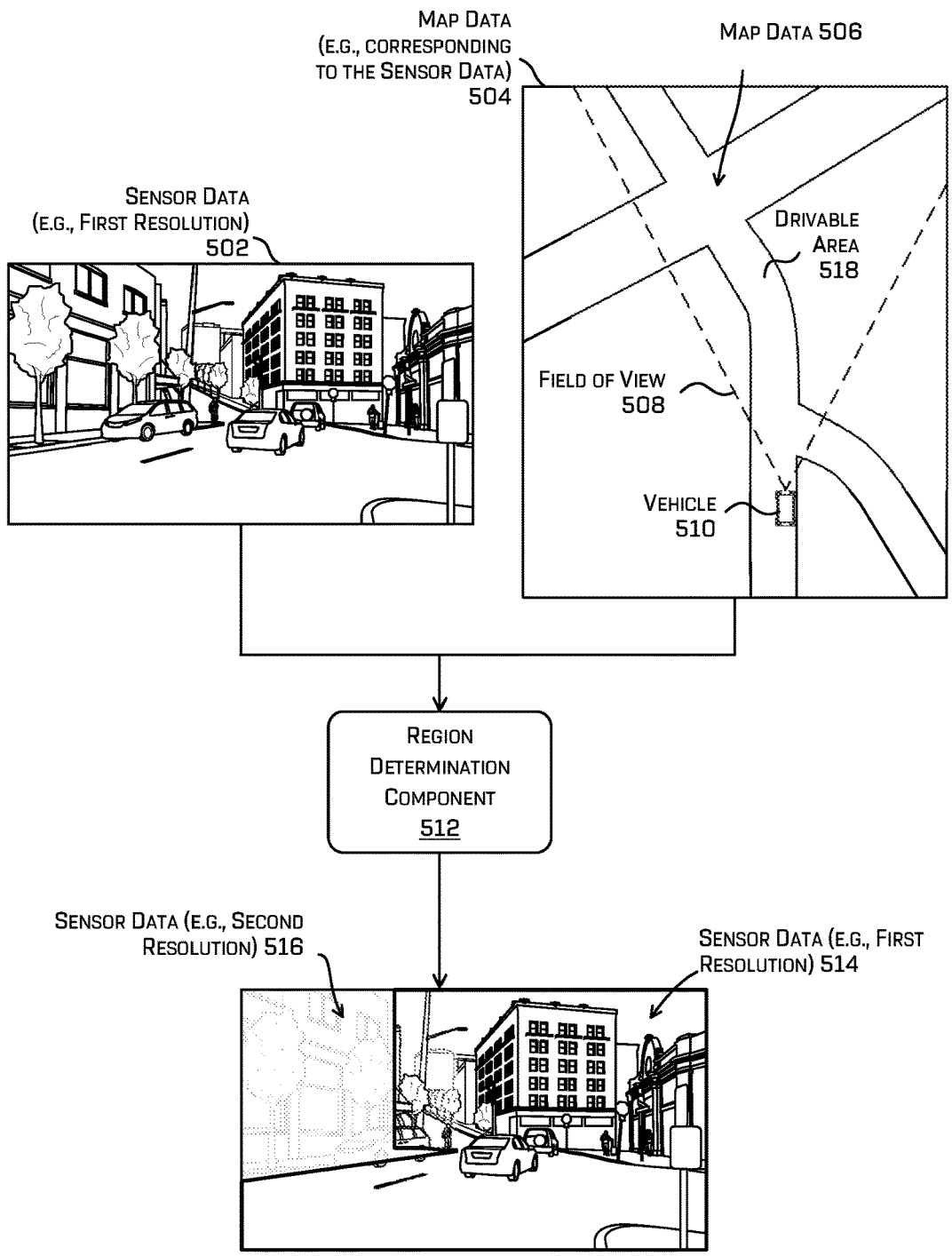
FIG. 5 is a pictorial flow diagram of an example process for identifying data levels for regions of sensor data based on map data.

FIG. 5 is a pictorial flow diagram of an example process 500 for identifying data levels for regions of sensor data based on map data and/or location data.

For example, the process 500 can include capturing sensor data 502 of an environment.

The process 500 can also include accessing map data 504 of an environment. A portion of the map data 504 can correspond to the environment represented in the sensor data 502. This portion of map data is illustrated as map data 506, which corresponds to a field of view 508 associated with one or more sensors on a vehicle 510.

In some examples, the sensor data 502 and the map data 504 can be input to a region determination component 512. In some examples, the region determination component 512 can determine a portion of the sensor data 502 to be processed at a first resolution (e.g., sensor data 514) and a portion of the sensor data 502 to be processed at a second resolution (e.g., sensor data 516). In some examples, in addition to or instead of the map data 504, the region determination component 512 can receive location data indicative of a location associated with a sensor (e.g., capturing the sensor data 502) in an environment. For example, location data can comprise GPS data comprising a location in a global coordinate frame (e.g., latitude and longitude, street location(s), and the like).

In some examples, the region determination component 512 can determine the portions of the sensor data 514 and/or 516 based on geometry of an environment based on the map data 504. For example, the region determination component 512 can unproject the sensor data 502 into the map data 504 to determine a distance between an origin associated with the vehicle 510 (or a sensor associated with the vehicle 510) and a region in the environment. In some examples, the region determination component 512 can project the map data 504 into the sensor data 502 to determine the distance. That is, the region determination component 512 can project, unproject, or otherwise associate sensor data with map data to determine distance(s), semantic information, and/or other information to determine a data level to process respective regions or portions of data. In some examples, if the distance meets or exceeds a threshold distance the region determination component 512 can determine to evaluate the sensor data 502 at a first resolution. In some examples, if the distance is below a threshold distance the region determination component can determine to evaluate the sensor data 502 at a second resolution that is less than the first resolution.

In some examples, the region determination component 512 can determine a data level associated with portion(s) of the sensor data 502 based at least in part on semantic information associated with portions of the environment represented in the sensor data 502. For example, the region determination component 512 can determine that a portion of the sensor data 502 corresponds to a drivable area 518 and can accordingly determine to process the sensor data 502 at a first resolution. In some examples, the map data 504 can comprise semantic information associated with portions of the environment. For example, semantic information can identify portions of the environment that include but are not limited to a drivable area, a building, vegetation, a sky area, and the like.

In some examples, the region determination component 512 can determine region(s) of the environment to be processed, transmitted, and/or stored at particular data level(s). For example, using the projection techniques and map data (e.g., the map data 504 discussed above), the region determination component 512 can identify regions of an environment where cross traffic is to be expected. In such a case, for example, based on a direction of traffic, a drivable area, and the like, the region determination component 512 can determine a high data level for processing, transmitting, and/or storing such data (e.g., as log data), while other region(s) may be evaluated at a same or different data level. By way of another example, the region determination component 512 can determine that a portion of data corresponds to a sky and accordingly can evaluate the region(s) at a lower data level. Of course, these examples are not intended to be limiting, and other implementations are considered within the scope of this disclosure.

In some examples, the map data 504 can be input along with the difference(s) 134, 314, and/or 414 (also referred to as difference information) to the training component 136 to train a machine learned model to determine data level(s) associated with sensor data. Accordingly, a machine learned model can incorporate map data into determining data level(s) associated with sensor data.

Figure 6:
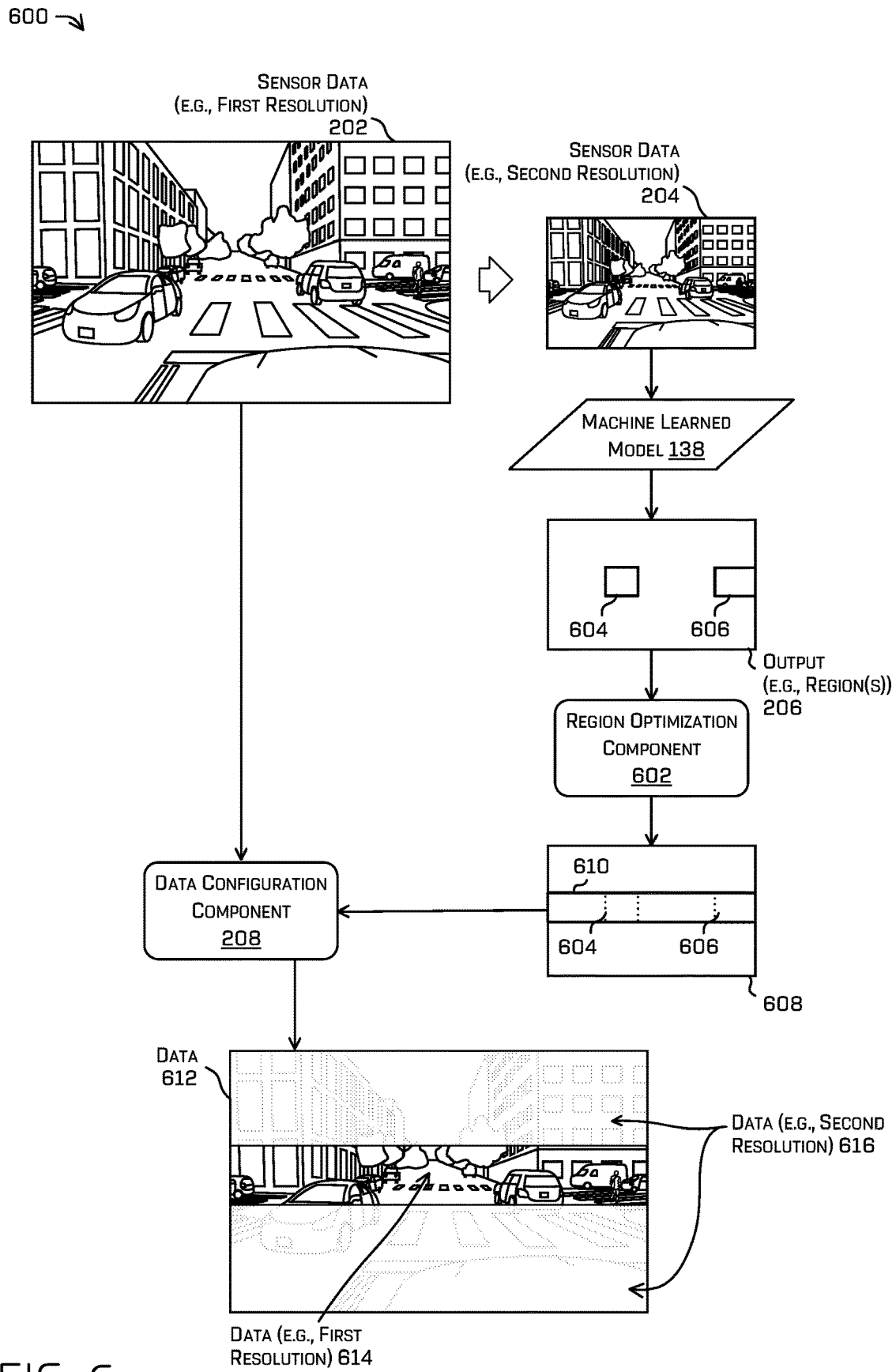
FIG. 6 is a pictorial flow diagram of an example process for optimizing regions of data for inputting data to a graphics processing unit.

FIG. 6 is a pictorial flow diagram of an example process 600 for optimizing regions of data for inputting data to a graphics processing unit.

In some examples, the process 600 can include capturing or receiving sensor data of an environment. In the context of an autonomous vehicle, the process 600 can include capturing sensor data 202 (e.g., image data associated with a first resolution). The sensor data 202 can be down sampled, compressed, or otherwise manipulated to generate or determine sensor data 204 (e.g., image data associated with a second resolution that is less than the first resolution).

The sensor data 204 can be input to the machine learned model 138 (e.g., trained in accordance with the process described in connection with FIG. 1). In some examples, the machine learned model 138 is trained to identify portion(s) or region(s) of the sensor data 204 that should be processed at the first resolution and/or the second resolution.

An example output of the machine learned model 138 is illustrated as an output 206. In some examples, the output 206 can identify portion(s) or region(s) of the sensor data 204 and/or a data level associated with such portion(s) or region(s).

In some examples, the machine learned model 138 can determine that a region corresponding to the entirety of the sensor data 204 should be represented at the first resolution or the second resolution.

The output 206 can be received by a region optimization component 602. In some examples, the region optimization component 602 can determine an optimized portion or region of the sensor data 202 and/or 204 for input to a graphics processing unit (GPU). For example, where two regions (e.g., 604 and 606) of the output 206 are identified as regions to be processed at the first resolution, and whereby the regions 604 and 606 may at least partially overlap in a horizontal portion of the image data, the region optimization component 602 can determine a "band" of image data corresponding to the regions 604 and 606.

An output of the region optimization component 602 is illustrated as an output 608, which includes a region 610 based at least in part on the regions 604 and/or 606. In some examples, the region 610 can be based at least in part on a single region (e.g., 604 or 606). For example, the region 610 can be determined in the event a region (or regions) spans a portion of the sensor data 202 and/or 204 that meets or exceeds a threshold width (or height) (e.g., in pixels) of the sensor data 202 and/or 204. In some examples, the region 610 can be determined a region (or regions) span a portion of the sensor data 202 and/or 204 that meets or exceeds a threshold percentage (e.g., a percentage of high resolution region relative to a width or height of the sensor data 202 and/or 204).

The output 608 can be provided to the data configuration component 208. Further, the data configuration component 208 can receive at least a portion of the sensor data 202 and/or the sensor data 204. Based on the output 608, the data configuration component 208 can select, determine, or otherwise generate data 612 to be used to subsequent processing. For the purpose of discussion, the data 612 illustrated as an image comprising data 614 (e.g., associated with a first resolution) and data 616 (e.g., associated with a second resolution). The data 616 is illustrated at a same scale of the sensor data 202 but is illustrated in gray to aid in understanding.

In some examples, the region optimization component 602 can comprise a machine learned model trained to determine a "band" of image data to optimize subsequent processing, transmission, and/or storage. For example, the region optimization component 602 can be trained by determining the output 206 and the output 608 and performing subsequent processing, transmission, and/or storage based on the respective outputs. In some examples, a processing time, a transmission time, and/or a storage time can be determined for each of the outputs 206 and 608 can the respective metrics can be used as ground truth data to train a model. Thus, the region optimization component 602 can comprise a machine learned model that can evaluate whether data should be processed as the output 206 or the output 608, for example, to optimize subsequent processing, transmission, and/or storage operations.

The data 612 can be input to an algorithm (e.g., the algorithm 218) for subsequent processing, as discussed herein. In this matter, contiguous blocks or chunks of data (e.g., represented by the region 610) can be input to a GPU for subsequent processing to improve a computational efficiency of the GPU. Thus, region(s) not indicated as benefitting from a highest data level can be input to an algorithm at a highest data level to improve subsequent operations on the GPU, thereby improving the overall efficiency of the operations discussed herein.

Figure 7:
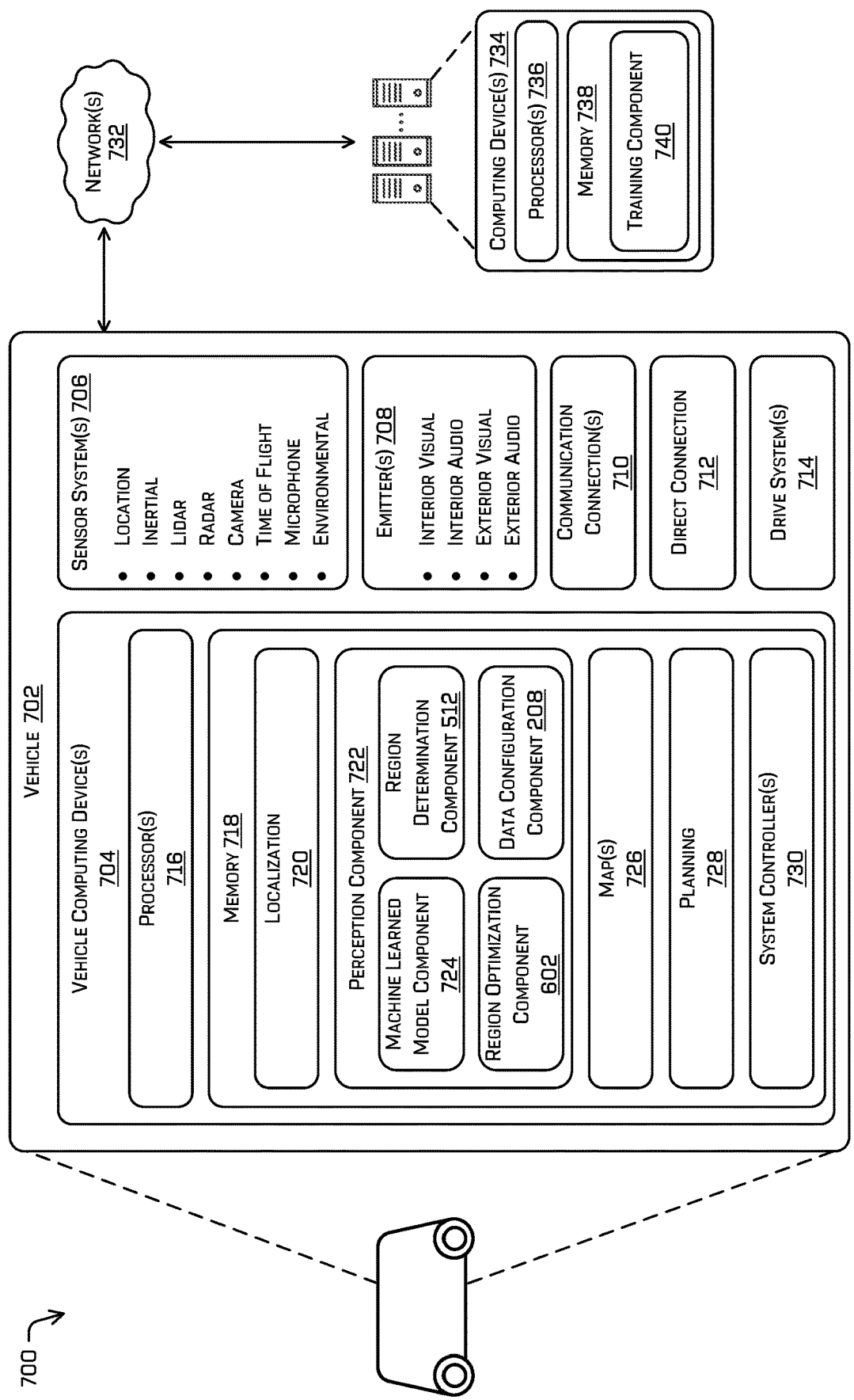
FIG. 7 depicts a block diagram of an example system for implementing the techniques described herein.

FIG. 7 depicts a block diagram of an example system 700 for implementing the techniques described herein. In at least one example, the system 700 can include a vehicle 702. In some examples, the vehicle 702 can correspond to the vehicle 510 in FIG. 5.

The example vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 702 can include vehicle computing device(s) 704, one or more sensor systems 706 (also referred to as sensor system(s) 706), one or more emitters 708 (also referred to as emitter(s) 708), one or more communication connections 710 (also referred to as communication connection(s) 710), at least one direct connection 712 (also referred to as direct connection(s) 712), and one or more drive systems 714 (also referred to as drive system(s) 714).

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722 comprising a machine learned model component 724, the region determination component 512, the region optimization component 602, and the data configuration component 208, one or more maps 726, a planning component 728, and one or more system controllers 730. Though depicted in FIG. 7 as residing in the memory 718 for illustrative purposes, it is contemplated that the localization component 720, the perception component 722, the machine learned model component 724, the region determination component 512, the region optimization component 602, the data configuration component 208, the one or more maps 726, the planning component 728, and the one or more system controllers 730 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory or for determining data level(s) for portion(s) or region(s) of sensor data to be processed, as discussed herein.

In some instances, and in general, the perception component 722 can include functionality to perform object detection, segmentation, and/or classification according to the techniques discussed herein. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, and in general, the machine learned model component 724 can include functionality to receive sensor data (or more generally, data) to determine data level(s) for portion(s) or region(s) for subsequent processing. In some examples, the machine learned model component 724 can correspond to the machine learned model 138, 316, and/or 416.

In some examples, the machine learned model component 724 can include functionality to determine data level(s) for portion(s) or region(s) of sensor data and to perform additional processing on such sensor data. That is, in some instances, the machine learned model component 724 can comprise multiple functions to receive sensor data, down sample, compress, or otherwise generate sensor data corresponding to different data level(s), determine which portions of the data to process at the respective data level(s), and to process the data at the respective data level(s).

In some examples, the machine learned model component 724 is a machine learned model such as a neural network, a fully connected neural network, a convolutional neural network, a recurrent neural network, and the like.

In some instances, and in general, the region determination component 512 can include functionality to determine, based at least in part on map data, data level(s) for portion(s) or region(s) of sensor data for subsequent processing. For example, the region determination component 512 can determine a portion of the sensor data to be processed at a first data level and a portion of the sensor data to be processed at a second data level.

In some examples, the region determination component 512 can determine data levels for portions of sensor data based on geometry of an environment based on map data. For example, the region determination component 512 can unproject sensor data into map data to determine a distance between an origin associated with the vehicle 702 and a region in the environment. In some examples, if the distance meets or exceeds a threshold distance the region determination component 512 can determine to evaluate sensor data at a first data level. In some examples, if the distance is below a threshold distance the region determination component 512 can determine to evaluate sensor data at a second data level that is less than the first data level. In some examples, the region determination component 512 can determine a data level to evaluate sensor data based at least in part on map data (e.g., representing semantic information about an environment) and/or location data (e.g., representing a location in an environment). As noted above, the region determination component 512 can use the map data to determine a data level for region(s) of sensor data based on a geometry of an environment, distances between a sensor and a data point or region in an environment, semantic information associated with region(s) of the map data, and the like. In some examples, the region determination component 512 can use the location data to determine a data level for region(s) of sensor data based on stored data levels associated with the location and/or orientation of a sensor capturing sensor data, a sensor type, and the like.

Of course, and as noted above, in some examples, functions of the region determination component 512 can be incorporated into the machine learned model component 724. That is, the machine learned model component 724 can receive map data for determining data level(s) for sensor data, as discussed herein. Additional details of the region determination component 512 are discussed above with respect to FIG. 5, as well as throughout this disclosure.

In some instances, and in general, the region optimization component 602 can include functionality to combine, aggregate, or otherwise modify portion(s) or region(s) associated with data level(s) to optimize the data to be input to a graphics processing unit (GPU), for example. In some cases, the region optimization component 602 can combine regions to generate horizontal or vertical "bands" to provide "chunks" of data having a same data level for processing by a GPU. Additional details are discussed above with respect to FIG. 6, as well as throughout this disclosure.

In some instances, and in general, the data configuration component 208 can include functionality to receive indication(s) of data level(s) associated with portion(s) or region(s) of data for subsequent processing. The data configuration component 208 can select, determine, generate, or otherwise manipulate data to provide the appropriate data levels and regions for subsequent processing. In some examples, the data configuration component 208 can associate regions between first data (associated with a first data level) and second data (associated with a second data level). That is, the data configuration component 208 can map data sets to determine that the relevant portions are provided for subsequent processing.

The memory 718 can further include one or more maps 726 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 726 can include at least one map (e.g., images and/or a mesh).

In some examples, the vehicle 702 can be controlled based at least in part on the map(s) 726. That is, the map(s) 726 can be used in connection with the localization component 720, the perception component 722, and/or the planning component 728 to determine a location of the vehicle 702, identify objects in an environment, and/or generate routes and/or trajectories to navigate within an environment.

In some examples, the one or more maps 726 can be stored on a remote computing device(s) (such as the computing device(s) 734) accessible via network(s) 732. In some examples, multiple maps 726 can be stored based on, for example, a characteristic (e.g., type of entity, time of day, day of week, season of the year, etc.). Storing multiple maps 726 can have similar memory requirements, but can increase the speed at which data in a map can be accessed.

In general, the planning component 728 can determine a path for the vehicle 702 to follow to traverse the environment. For example, the planning component 728 can determine various routes and trajectories and various levels of detail. For example, the planning component 728 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some examples, the planning component 728 can include a prediction component that can include functionality to generate predicted information associated with objects and/or occluded regions in an environment. In some examples, a prediction component can be implemented to predict locations of occlusions in an environment based on movement of an object and/or predicted location(s) of the vehicle 702 along a candidate trajectory. In some examples, the techniques discussed herein can be implemented to predict locations of objects (e.g., a vehicle, a pedestrian, and the like) as the vehicle traverses an environment. In some examples, a prediction component can generate one or more predicted trajectories for such target objects based on attributes of the target object and/or other objects proximate the target object.

In at least one example, the vehicle computing device(s) 704 can include one or more system controllers 730, which can be configured to control steering, propulsion, braking, safety, emitters, communication, and other systems of the vehicle 702. These system controller(s) 730 can communicate with and/or control corresponding systems of the drive system(s) 714 and/or other components of the vehicle 702.

As can be understood, the components discussed herein (e.g., the localization component 720, the perception component 722, the machine learned model component 724, the region determination component 512, the region optimization component 602, the data configuration component 208, the one or more maps 726, the planning component 728, and the one or more system controllers 730) are described as divided for illustrative purposes. However, the operations performed by the various components can be combined or performed in any other component. Further, any of the components discussed as being implemented in software can be implemented in hardware, and vice versa. Further, any functionality implemented in the vehicle 702 can be implemented in the computing device(s) 734, or another component (and vice versa).

In at least one example, the sensor system(s) 706 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the time of flight sensors can include individual time of flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more network(s) 744, to the one or more computing device(s) 746 at a particular frequency, after a lapse of a predetermined period of time, in near real-time, etc.

The vehicle 702 can also include one or more emitters 708 for emitting light and/or sound, as described above. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 732. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the machine learned model component 724, the region determination component 512, the region optimization component 602, the data configuration component 208, the one or more maps 726, the planning component 728, and the one or more system controllers 730 can process sensor data, as described above, and can send their respective outputs, over the one or more networks 732, to one or more computing devices 734. In at least one example, the localization component 720, the perception component 722, the machine learned model component 724, the region determination component 512, the region optimization component 602, the data configuration component 208, the one or more maps 726, the planning component 728, and the one or more system controllers 730 can send their respective outputs to the one or more computing devices 734 at a particular frequency, after a lapse of a predetermined period of time, in near real-time, etc.

In some examples, the vehicle 702 can send sensor data to one or more computing devices 734 via the network(s) 732. In some examples, the vehicle 702 can send raw sensor data to the computing device(s) 734. In other examples, the vehicle 702 can send processed sensor data and/or representations of sensor data to the computing device(s) 734. In some examples, the vehicle 702 can send sensor data to the computing device(s) 734 at a particular frequency, after a lapse of a predetermined period of time, in near real-time, etc. In some cases, the vehicle 702 can send sensor data (raw or processed) to the computing device(s) 734 as one or more log files.

The computing device(s) 734 can include processor(s) 736 and a memory 738 storing a training component 740.

In some instances, the training component 740 can include functionality to train one or more models to determine data level(s) for portion(s) or region(s) of sensor data, as discussed herein. In some instances, the training component 740 can communicate information generated by the one or more models to the vehicle computing device(s) 704 to revise how to control the vehicle 702 in response to different situations.

For example, the training component 740 can train one or more machine learning models to generate the machine learned model components discussed herein. In some examples, the training component 740 can include functionality to search data logs and determine sensor data for training. The training component 740 can generate training data associated with different levels and can input the training data to algorithms to determine differences in outputs. The training component 740 can determine differences or can receive the differences from another component. The differences and training data can be input to a machine learning model where a known result (e.g., a ground truth, such as the known portions or regions corresponding to differences between algorithm outputs) can be used to adjust weights and/or parameters of the machine learning model to minimize an error.

For instance, aspects of some or all of the components discussed herein can include any models, algorithms, and/or machine learned algorithms. For example, in some instances, the components in the memory 738 (and the memory 718, discussed above) can be implemented as a neural network. In some examples, the training component 740 can utilize a neural network to generate and/or execute one or more models to determine data level(s) for portion(s) or region(s) of sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 716 of the vehicle 702 and the processor(s) 736 of the computing device(s) 734 can be any suitable processor capable of executing instructions to process data and perform operations as described herein. By way of example and not limitation, the processor(s) 716 and 736 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 738 are examples of non-transitory computer-readable media. The memory 718 and 738 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 734 and/or components of the computing device(s) 746 can be associated with the vehicle 702. That is, the vehicle 702 can perform one or more of the functions associated with the computing device(s) 734, and vice versa. Further, aspects of the perception component 722 (and subcomponents) can be performed on any of the devices discussed herein.

Figure 8:
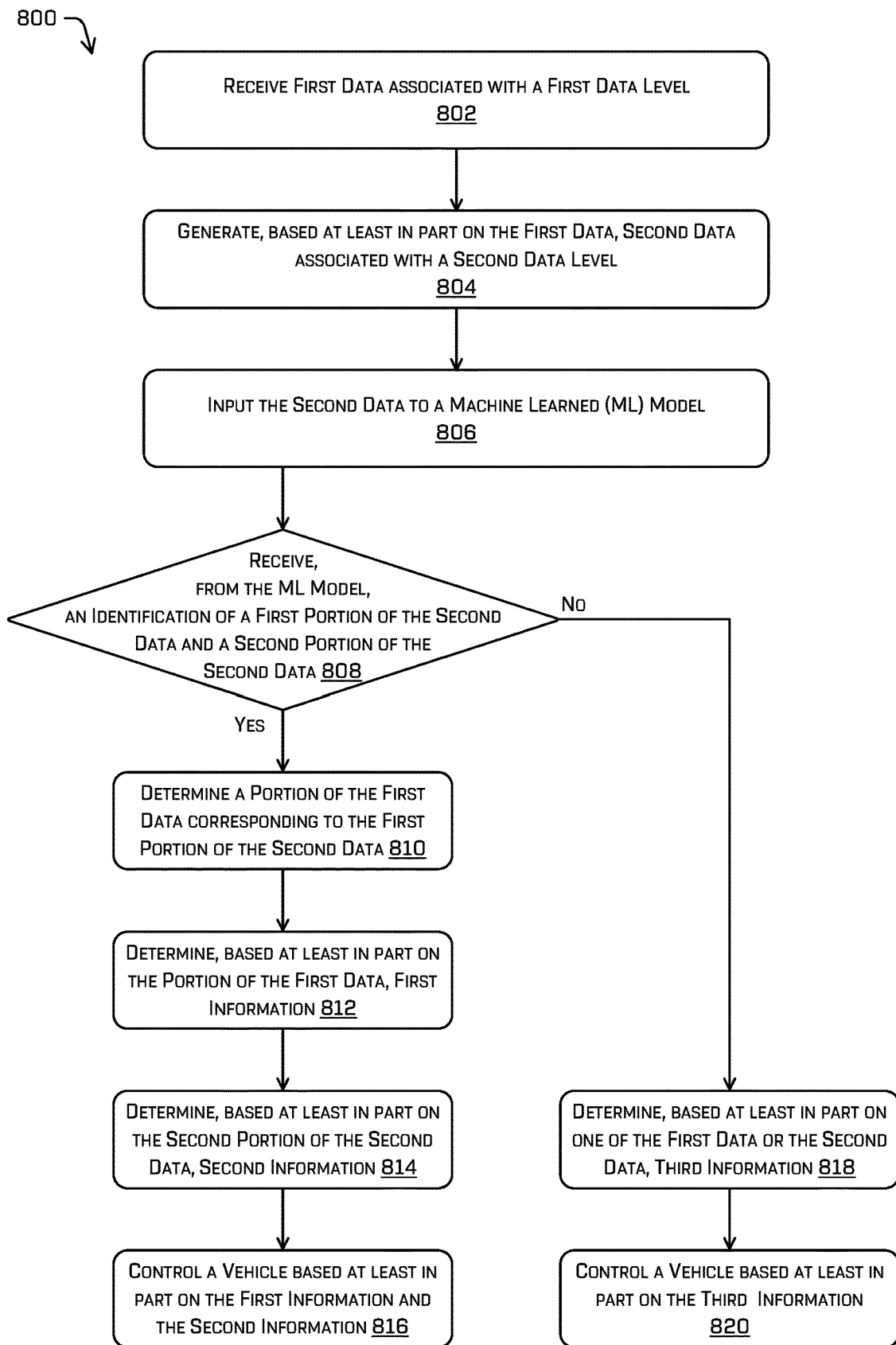
FIG. 8 depicts an example process for determining data level(s) for region(s) of data, processing the data based on the data level(s), and controlling an autonomous vehicle.

FIG. 8 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 8 depicts an example process 800 for determining data level(s) for region(s) of data, processing the data based on the data level(s), and controlling an autonomous vehicle. For example, some or all of the process 800 can be performed by one or more components in FIG. 7, as described herein. For example, some or all of the process 800 can be performed by the vehicle computing device(s) 704.

At operation 802, the process can include receiving first data associated with a first data level. In some examples, the first data can comprise sensor data captured by a sensor. In some examples, the operation 802 can include receiving and/or capturing time of flight data, lidar data, image data, radar data, and the like, of an environment. In some examples, the data level can correspond to a particular resolution, compression level, format, bit rate, codec, and the like. In some examples, the operation 802 can be performed by a vehicle (e.g., an autonomous vehicle) as the vehicle traverses the environment.

At operation 804, the process can include generating, based on the first data, second data associated with a second data level. In some examples, the operation 804 can include down sampling, compressing, converting, or otherwise manipulating the first data to generate the second data. That is, in some examples, the operation 804 can include determining the second data without necessarily generating any second data. In some examples, the second data level may be less than the first data level. In the context of resolution, the second data level may correspond to a resolution that is lower than a resolution associate with the first data level. In the context of compression, the second data level may correspond to a compression level that is more compressed than a compression level that is associated with the first data level.

At operation 806, the process can include inputting the second data to a machine learned (ML) model. In some instances, the operation 806 can include inputting the first data and/or map data into the ML model as well. In some examples, the ML model can be trained in accordance with the techniques discussed herein.

An operation 808 can include determining whether an identification of a first portion of the second data and a second portion of the second data is received from the ML model. That is, in some instances, depending on data to be evaluated, the machine learned model may or may not determine that data is to be evaluated at different levels, and thus, the operation 808 can include determining whether multiple data levels are to be evaluated or whether a single data level is to be evaluated. If the identification of the first portion and the second portion of the second data is received in the operation 808 (e.g., "yes" in operation 808) the process continues to operation 808. If the identification of the first portion and the second portion of the second data is not received in the operation 808 (e.g., "no" in operation 808) the process continues to operation 818.

At operation 810, the process can include determining a portion of the first data corresponding to the first portion of the second data. For example, the operation 810 can include mapping a location, region, or portion of the second data to the first data. In some examples, the operation 810 can be based on geometrically matching the regions in the portions and/or can be based on pixel-matching, scale-invariant feature transform (SIFT), differencing, or image and/or data registration techniques. In some examples, where the second data is scaled proportionally to the first data, the corresponding regions can be mapped based on similar proportional scaling.

At operation 812, the process can include determining, based at least in part on the portion of the first data (e.g., determined in the operation 810), first information. In some examples, the operation 812 can be performed by an algorithm, such as a machine learned algorithm, and can include generating information including but not limited to detection information, classification information, segmentation information, and the like.

At operation 814, the process can include determining, based at least in part on the second portion of the second data (e.g., received in the operation 808), second information. In some examples, the operation 814 can be performed by an algorithm, such as a machine learned algorithm, and can include generating information including but not limited to detection information, classification information, segmentation information, and the like. In some examples, the operations 812 and 814 can be performed serially, in parallel, and/or substantially simultaneously, based on technical tolerances and particular implementations (e.g., representing the first data and the second data as a composite data or inputting individually portions separately into the machine learned model).

At operation 816, the process can include controlling a vehicle based at least in part on the first information and the second information. In some instances, the operation 816 can include generating a trajectory to stop the vehicle or to otherwise control the vehicle to safely traverse the environment. In some examples, the operation 816 can include modifying a candidate trajectory based on detected objects, for example, to determine a modified trajectory for the vehicle to follow in the environment.

As noted above, if the identification of the first portion and the second portion of the second data is not received in the operation 808 (e.g., "no" in operation 808) the process continues to operation 818. In some examples, an identification of the first portion and the second portion would not be received in the event that an entirety of the first data or the second data is to be subsequently processed. In some examples, the ML model can determine that all portions of the first data are to be processed, and in some examples, the ML model can determine that all portions of the second data are to be processed.

At operation 818, the process can include determining, based on one of the first data or the second data, third information. As noted above, in some examples, the ML model can determine that all portions of the first data are to be processed, and in some examples, the ML model can determine that all portions of the second data are to be processed. That is, the third information or third data can be determined based on one of the first data or the second data. As noted above, in some examples, third information can comprise information determined by an algorithm, such as a machine learned algorithm, and can include information including but not limited to detection information, classification information, segmentation information, and the like.

At operation 820, the process can include controlling a vehicle based at least in part on the third information. In some instances, the operation 820 can include generating a trajectory to stop the vehicle or to otherwise control the vehicle to safely traverse the environment. In some examples, the operation 820 can include modifying a candidate trajectory based on detected objects, for example, to determine a modified trajectory for the vehicle to follow in the environment.

In some examples, depending on the context of the techniques implemented herein, the operations 816 and/or 820 may not involve control of an autonomous vehicle. For example, the techniques discussed herein may include transmitting data and/or storing data in memory. In the context of a security system including an image sensor, for example, the techniques herein may be used to reduce an amount of data to be transmitted to a central server for subsequent processing and/or storage. Thus, the techniques discussed herein can be implemented in a variety of context to optimize data processing, transmission, storage, and the like.

EXAMPLE CLAUSES

A. A system comprising: one or more processors; and one or more computer-readable media storing instructions executable by the one or more processors, wherein the instructions, when executed, cause the system to perform operations comprising: capturing first data of an environment using a sensor of an autonomous vehicle, the first data associated with a first resolution; determining, based on the first data, second data associated with a second resolution which differs from the first resolution; inputting the second data to a machine learned model; receiving, from the machine learned model, an identification of a first portion of the second data; determining a second portion of the first data associated with the first portion of the second data; determining, based at least in part on the second portion of the first data, first information comprising one or more first detection information, first classification information, or first segmentation information; determining, based at least in part on the first portion of the second data, second information comprising one or more second detection information, second classification information, or second segmentation information; and controlling the autonomous vehicle based at least in part on the first information and the second information.

B: The system of paragraph A, wherein the machine learned model is trained based at least in part on difference information comprising: a first output of an algorithm receiving first training data associated with the first resolution; and a second output of the algorithm receiving second training data associated with the second resolution.

C: The system of paragraph B, wherein the difference information comprises at least one difference between the first output and the second output.

D: The system of any of paragraphs A-C, wherein determining the second data comprises at least one of down sampling the first data, compressing the first data, or generating the second data based on the first data.

E: The system of any of paragraphs A-D, wherein the first data comprises at least one of image data, lidar data, radar data, time of flight data, sonar data, or audio data.

F: A method comprising: receiving first data associated with a first data level; determining, based on the first data, second data associated with a second data level that is different than the first data level; determining a first portion of the second data to process at the first data level; determining a second portion of the first data associated with the first portion of the second data; determining, based at least in part on the second portion of the first data, first information comprising one or more first detection information, first classification information, or first segmentation information; and determining, based at least in part on the second data, second information comprising one or more second detection information, second classification information, or second segmentation information.

G: The method of paragraph F, wherein determining the first portion of the second data comprises inputting the second data to a machine learned model trained to identify portions of data to process at the first data level.

H: The method of paragraph G, wherein the machine learned model is trained based at least in part on difference information comprising: a first output of an algorithm receiving first training data associated with the first data level; and a second output of the algorithm receiving second training data associated with the second data level.

I: The method of paragraph H, wherein the difference information comprises at least one difference between the first output and the second output, wherein the difference is associated with a least one of detection information, classification information, or segmentation information.

J: The method of any of paragraphs G-I, wherein the first data level is associated with at least one of: a resolution level; a bit rate; or a compression level.

K: The method of any of paragraphs F-J, wherein the first data is captured using a sensor of a vehicle in an environment, the method further comprising: receiving location data indicative of a location of the vehicle in the environment; and determining the first portion of the second data based at least in part on the location data.

L: The method of paragraph K, wherein the location data comprises map data.

M: The method of paragraph L, wherein determining the first portion of the second data comprises determining that a distance between a region of the environment represented by the first portion of the second data and the location is below a threshold distance.

N: The method of any of paragraphs F-M, wherein the first data comprises at least one of image data, lidar data, radar data, time of flight data, sonar data, or audio data.

O: The method of any of paragraphs F-N, wherein the first data is captured using a sensor of an autonomous vehicle, the method further comprising: controlling the autonomous vehicle based at least in part on the first information and the second information.

P: The method of any of paragraphs F-O, further comprising: determining, based on the second portion of the first data, an updated second portion of the first data to optimize processing on a graphics processing unit.

Q: The method of any of paragraphs F-P, further comprising: storing, as log data, the first portion of the first data and the second portion of the second data.

R: A non-transitory computer-readable medium storing instructions that, when executed, cause one or more processors to perform operations comprising: receiving first data associated with a first data level; determining, based on the first data, second data associated with a second data level that is different than the first data level; determining a first portion of the second data; determining a second portion of the first data associated with the first portion of the second data; and performing, based at least in part on the second data and the second portion of the first data, at least one of a processing operation, a transmitting operation, or a storing operation.

S: The non-transitory computer-readable medium of paragraph R, wherein determining the first portion of the second data comprises inputting the second data to a machine learned model trained to identify portions of data to process at the first data level.

T: The non-transitory computer-readable medium of paragraph R or S, wherein at least one of: the processing operation comprises at least one of a detection operation, a classification operation, or a segmentation operation; the transmitting operation comprises transmitting the second portion of the first data to a remote computing device; or the storing operation comprises storing, as log data, at least the first portion of the second data and the second portion of the first data.

U: A system comprising: one or more processors; and one or more computer-readable media storing instructions executable by the one or more processors, wherein the instructions, when executed, cause the system to perform operations comprising: receiving first image data associated with a first resolution; receiving second image data associated with the first image data, wherein the second image data is associated with a second resolution that differs from the first resolution; determining, based at least in part on the first image data, first information comprising one or more first detection information, first classification information, or first segmentation information; determining, based at least in part on the second image data, second information comprising one or more second detection information, second classification information, or second segmentation information; determining a difference between the first information and the second information; and training, based at least in part on the difference, a machine learning model to identify a first region associated with input data to process at the first resolution and a second region associated with the input data to process at the second resolution.

V: The system of paragraph U, wherein the difference is based at least in part on: a number of detections associated with the first image data or the second image data; a difference between a first class associated with the first classification information and a second class associated with the second classification information; a confidence level associated with segmentation information or classification information; a size of a bounding box associated with the first image data or the second image data; and a location of a bounding box associated with the first image data or the second image data.

W: The system of paragraph U or V, wherein a first region of the first image data associated with the first information corresponds to a second region of the second image data associated with the second information.

X: The system of any of paragraphs U-W, wherein the difference comprises ground truth data for training the machine learning model, and wherein receiving the second image data comprises one or more of: down-sampling the first image data, or compressing the first image data.

Y: The system of any of paragraphs U-X, the operations further comprising: sending the machine learning model to an autonomous vehicle to determine a region to process at the first resolution or the second resolution.

Z: A method comprising: receiving first data associated with a first data level; receiving second data associated with a second data level that differs from the first data level; determining, based at least in part on the first data, first information comprising one or more first detection information, first classification information, or first segmentation information; determining, based at least in part on the second data, second information comprising one or more second detection information, second classification information, or second segmentation information; determining a difference between the first information and the second information; and training, based at least in part on the difference, a machine learning model to identify a region associated with input data to process at the first data level or the second data level.

AA: The method of paragraph Z, wherein the first data level is associated with at least one of: a resolution level; a bit rate; or a compression level.

AB: The method of paragraph Z or AA, wherein receiving the second data comprises at least one of: generating the second data based on the first data; down sampling the first data; or compressing the first data.

AC: The method of any of paragraphs Z-AB, wherein: the first data comprises first image data associated with first lidar data; the second data comprises second image data associated with second lidar data; the first image data is associated with the second image data; and the first lidar data is associated with the second lidar data.

AD: The method of any of paragraphs Z-AC, wherein the difference is based at least in part on: a number of detections associated with the first data or the second data; a first class associated with the first information and a second class associated with the second information; a confidence level associated with segmentation information or classification information; a size of a bounding box associated with the first data or the second data; and a location of a bounding box associated with the first data or the second data.

AE: The method of any of paragraphs Z-AD, wherein determining the difference comprises: determining a first region of the first data associated with the first information; and determining a second region of the second data associated with the second region, wherein the first region corresponds to the second region.

AF: The method of paragraph AE, wherein the difference is indicative of processing data associated with the first region at the first data level.

AG: The method of any of paragraphs Z-AF, wherein the first data comprises at least one of image data, lidar data, radar data, time of flight data, sonar data, or audio data.

AH: The method of any of paragraphs Z-AG, wherein training the machine learning model further comprises training the machine learning model to optimize the region for processing on a graphics processing unit.

AI: A non-transitory computer-readable medium storing instructions that, when executed, cause one or more processors to perform operations comprising: receiving first data associated with a first data level; receiving second data associated with a second data level that differs from the first data level; determining, based at least in part on the first data, first information comprising one or more first detection information, first classification information, or first segmentation information; determining, based at least in part on the second data, second information comprising one or more second detection information, second classification information, or second segmentation information; determining a difference between the first information and the second information; and training, based at least in part on the difference, a machine learning model to identify a region associated with input data to process at the first data level or the second data level.

AJ: The non-transitory computer-readable medium of paragraph AI, wherein receiving the second data comprises at least one of: generating the second data based on the first data; down sampling the first data; or compressing the first data.

AK: The non-transitory computer-readable medium of paragraph AI or AJ, wherein the difference is based at least in part on: a number of detections associated with the first data or the second data; a first classification associated with the first information and a second classification associated with the second information; a confidence level associated with segmentation information or classification information; a size of a bounding box associated with the first data or the second data; and a location of a bounding box associated with the first data or the second data.

AL: The non-transitory computer-readable medium of paragraph AK, wherein the first information is associated with a first region, and wherein the second information is associated with a second region, the second region corresponding to the first region.

AM: The non-transitory computer-readable medium of any of paragraphs AI-AL, wherein the difference is indicative of processing data associated with the first data level.

AN: The non-transitory computer-readable medium of any of paragraphs AI-AM, wherein the difference is a first difference, the operations further comprising: receiving third data associated with a third data level that differs from the first data level and the second data level; determining, based at least in part on the third data, third information comprising one or more third detection information, third classification information, or third segmentation information; determining a second difference between the third information and at least one of the first information or the second information; and training the machine learning model further based at least in part on the second difference.

AO. A system comprising: one or more processors; and one or more computer-readable media storing instructions executable by the one or more processors, wherein the instructions, when executed, cause the system to perform operations comprising: capturing first image data of an environment using a sensor of an autonomous vehicle, the first image data associated with a first resolution; determining location data indicative of a location of the autonomous vehicle in the environment; determining, as second image data and based at least in part on the first image data and the location data, a portion of the first image data to process at a second resolution that is different than the first resolution; determining, based at least in part on the first image data, first information comprising one or more first detection information, first classification information, or first segmentation information; determining, based at least in part on the second image data, second information comprising one or more second detection information, second classification information, or second segmentation information; and controlling the autonomous vehicle based at least in part on the first information and the second information.

AP: The system of paragraph AO, the operations further comprising: receiving, based at least in part on the location data, map data representing the environment; determining, based at least in part on the map data, semantic information associated with the portion of the first image data; and determining the portion of the first image data to process at the second resolution based at least in part on the semantic information.

AQ: The system of paragraph AP, the operations further comprising: associating the first image data with the map data to determine the semantic information.

AR: The system of any of paragraphs AO-AQ, wherein determining the portion of the first image data to process at the second resolution comprises determining that a distance between a region of the environment represented by the portion of the first image data and the location is below a threshold distance.

AS: The system of any of paragraphs AO-AR, wherein determining the portion of the first image data to process at the second resolution comprises inputting the first image data to a machine learned model trained to determine regions of image data to process at the first resolution or the second resolution.

AT: A method comprising: receiving first data representing an environment, the first data associated with a first data level; receiving location data indicative of a location in the environment; determining, as second data and based at least in part on the first data and the location data, a portion of the first data to process at a second data level that is different than the first data level; determining, based at least in part on the first data, first information comprising one or more first detection information, first classification information, or first segmentation information; and determining, based at least in part on the second data, second information comprising one or more second detection information, second classification information, or second segmentation information.

AU: The method of paragraph AT, further comprising: receiving, based at least in part on the location data, map data representing the environment; determining, based at least in part on the map data, semantic information associated with the portion of the first data; and determining the portion of the first data to process at the second data level based at least in part on the semantic information.

AV: The method of paragraph AU, further comprising: determining, based at least in part on associating the first data with the map data, the semantic information.

AW: The method of paragraph AU or AV, wherein the semantic information is associated with at least one of: a drivable area; a building; vegetation; or a sky area.

AX: The method of any of paragraphs AT-AW, wherein the first data comprises at least one of image data, lidar data, radar data, time of flight data, sonar data, or audio data; and wherein the first data level is associated with at least one of: a resolution level; a bit rate; or a compression level.

AY: The method of any of paragraphs AT-AX, wherein the location is a first location, and wherein determining the second data based at least in part on the first data and the location data comprises determining that a distance between the first location and a second location associated with a region of the environment represented by the portion of the first data meets or exceeds a threshold distance.

AZ: The method of any of paragraphs AT-AY, wherein determining the portion of the first data to process at the second data level comprises inputting the first data to a machine learned model trained to determine regions of data to process at the first data level or the second data level.

BA: The method of paragraph AZ, further comprising: inputting the location data to the machine learned model along with the first data to determine the regions of the data to process at the first data level or the second data level.

BB: The method of paragraph AZ or BA, further comprising: receiving, based at least in part on the location data, map data representing the environment; and inputting the map data to the machine learned model along with the first data to determine the regions of the data to process at the first data level or the second data level.

BC: A non-transitory computer-readable medium storing instructions that, when executed, cause one or more processors to perform operations comprising: receiving first data representing an environment, the first data associated with a first data level; receiving location data indicative of a location in the environment; determining, as second data and based at least in part on the first data and the location data, a portion of the first data to process at a second data level that is different than the first data level; determining, based at least in part on the first data, first information comprising one or more first detection information, first classification information, or first segmentation information; and determining, based at least in part on the second data, second information comprising one or more second detection information, second classification information, or second segmentation information.

BD: The non-transitory computer-readable medium of paragraph BC, the operations further comprising: receiving, based at least in part on the location data, map data representing the environment; determining, based at least in part on the map data, semantic information associated with the portion of the first data; and determining the portion of the first data to process at the second data level based at least in part on the semantic information.

BE: The non-transitory computer-readable medium of paragraph BD, the operations further comprising: associating the first data with the map data to determine the semantic information.

BF: The non-transitory computer-readable medium of any of paragraphs BC-BE, wherein the first data comprises at least one of image data, lidar data, radar data, time of flight data, sonar data, or audio data, and wherein determining the second data comprises one or more of: down sampling the first data, or compressing the first data.

BG: The non-transitory computer-readable medium of any of paragraphs BC-BF, the operations further comprising: wherein determining the portion of the first data to process at the second data level comprises inputting the first data to a machine learned model trained to determine regions of data to process at the first data level or the second data level.

BH: The non-transitory computer-readable medium of paragraph BG, wherein the location is a first location associated with a sensor capturing the first data, and wherein determining the second data based at least in part on the first data and the location data comprises determining that a distance between the first location and a second location associated with a region of the environment represented by the portion of the first data meets or exceeds a threshold distance.

While the example clauses described above are described with respect to one particular implementation, it should be understood that, in the context of this document, the content of the example clauses can also be implemented via a method, device, system, a computer-readable medium, and/or another implementation. Additionally any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving first image data associated with a first resolution;
receiving second image data associated with the first image data, wherein the second image data is associated with a second resolution that differs from the first resolution;
determining, based at least in part on the first image data, first information comprising one or more first detection information, first classification information, or first segmentation information;
determining, based at least in part on the second image data, second information comprising one or more second detection information, second classification information, or second segmentation information;
determining a difference between the first information and the second information, wherein the difference comprises ground truth data for training a machine learning model; and
training, based at least in part on the difference, the machine learning model to identify a first region associated with input data to process at the first resolution and a second region associated with the input data to process at the second resolution.

2. The system of claim 1, wherein the difference is based at least in part on at least one of:
a number of detections associated with the first image data or the second image data;
a difference between a first class associated with the first classification information and a second class associated with the second classification information;
a confidence level associated with segmentation information or classification information;
a size of a bounding box associated with the first image data or the second image data; or
a location of a bounding box associated with the first image data or the second image data.

3. The system of claim 1, wherein a first region of the first image data associated with the first information corresponds to a second region of the second image data associated with the second information.

4. The system of claim 1,
wherein receiving the second image data comprises one or more of:
down-sampling the first image data, or
compressing the first image data.

5. The system of claim 1, the operations further comprising:
sending the machine learning model to an autonomous vehicle to determine a region to process at the first resolution or the second resolution.

6. A method comprising:
receiving first data associated with a first data level;
receiving second data associated with a second data level that differs from the first data level;
determining, based at least in part on the first data, first information comprising one or more first detection information, first classification information, or first segmentation information;
determining, based at least in part on the second, second information comprising one or more second detection information, second classification information, or second segmentation information;
determining a difference between the first information and the second information, wherein the difference comprises ground truth data for training a machine learning model; and
training, based at least in part on the difference, the machine learning model to identify a region associated with input data to process at the first data level or the second data level.

7. The method of claim 6, wherein the first data level is associated with at least one of:
a resolution level;
a bit rate; or
a compression level.

8. The method of claim 6, wherein receiving the second data comprises at least one of:
generating the second data based on the first data;
down sampling the first data; or
compressing the first data.

9. The method of claim 6, wherein:
the first data comprises first image data associated with first lidar data;
the second data comprises second image data associated with second lidar data;
the first image data is associated with the second image data; and
the first lidar data is associated with the second lidar data.

10. The method of claim 6, wherein the difference is based at least in part on at least one of:
a number of detections associated with the first data or the second data;
a first class associated with the first information and a second class associated with the second information;
a confidence level associated with segmentation information or classification information;
a size of a bounding box associated with the first data or the second data; or
a location of a bounding box associated with the first data or the second data.

11. The method of claim 6, wherein determining the difference comprises:
determining a first region of the first data associated with the first information; and
determining a second region of the second data associated with the second region,
wherein the first region corresponds to the second region.

12. The method of claim 11, wherein the difference is indicative of processing data associated with the first region at the first data level.

13. The method of claim 6, wherein the first data comprises at least one of image data, lidar data, radar data, time of flight data, sonar data, or audio data.

14. The method of claim 6, wherein training the machine learning model further comprises training the machine learning model to optimize at least one of a size, a shape, or a location of the region for processing on a graphics processing unit.

15. One or more non-transitory computer-readable media storing instructions that, when executed, cause one or more processors to perform operations comprising:
- receiving first data associated with a first data level;
- receiving second data associated with a second data level that differs from the first data level;
- determining, based at least in part on the first data, first information comprising one or more first detection information, first classification information, or first segmentation information;
- determining, based at least in part on the second data, second information comprising one or more second detection information, second classification information, or second segmentation information;
- determining a difference between the first information and the second information, wherein the difference comprises ground truth data for training a machine learning model; and
- training, based at least in part on the difference, the machine learning model to identify a region associated with input data to process at the first data level or the second data level.

16. The one or more non-transitory computer-readable media of claim 15, wherein receiving the second data comprises at least one of:
- generating the second data based on the first data;
- down sampling the first data; or
- compressing the first data.

17. The one or more non-transitory computer-readable media of claim 15, wherein the difference is based at least in part on at least one of:
- a number of detections associated with the first data or the second data;
- a first classification associated with the first information and a second classification associated with the second information;
- a confidence level associated with segmentation information or classification information;
- a size of a bounding box associated with the first data or the second data; or
- a location of a bounding box associated with the first data or the second data.

18. The one or more non-transitory computer-readable media of claim 17,
- wherein the first information is associated with a first region, and
- wherein the second information is associated with a second region, the second region corresponding to the first region.

19. The one or more non-transitory computer-readable media of claim 15, wherein the difference is indicative of processing data associated with the first data level.

20. The one or more non-transitory computer-readable media of claim 15, wherein the difference is a first difference, the operations further comprising:
- receiving third data associated with a third data level that differs from the first data level and the second data level;
- determining, based at least in part on the third data, third information comprising one or more third detection information, third classification information, or third segmentation information;
- determining a second difference between the third information and at least one of the first information or the second information; and
- training the machine learning model further based at least in part on the second difference.

* * * * *